(12) United States Patent
Ansari (10) Patent No.: US 8,464,230 B2
(45) Date of Patent: Jun. 11, 2013

(54) METHODS AND SYSTEMS TO IMPLEMENT NON-ABI CONFORMING FEATURES ACROSS UNSEEN INTERFACES

(75) Inventor: Zia Ansari, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 527 days.

(21) Appl. No.: 12/759,487

(22) Filed: Apr. 13, 2010

(65) Prior Publication Data

US 2011/0252409 A1   Oct. 13, 2011

(51) Int. Cl.
*G06F 9/45* (2006.01)
(52) U.S. Cl.
USPC .......................................... 717/140; 717/162
(58) Field of Classification Search
USPC .................................. 717/140, 162
See application file for complete search history.

(56) References Cited

U.S. PATENT DOCUMENTS

| 6,199,200 | B1 | 3/2001 | Acker et al. | |
|---|---|---|---|---|
| 2006/0112374 | A1* | 5/2006 | Oliva | 717/127 |
| 2007/0157178 | A1* | 7/2007 | Kogan et al. | 717/130 |
| 2008/0098377 | A1* | 4/2008 | Barnak | 717/162 |
| 2009/0172652 | A1* | 7/2009 | Simon et al. | 717/148 |
| 2010/0037208 | A1* | 2/2010 | Gray et al. | 717/122 |

FOREIGN PATENT DOCUMENTS

| CN | 1809812 | A | 7/2006 |
|---|---|---|---|
| CN | 1975666 | A | 6/2007 |
| JP | 62-262135 | A | 11/1987 |
| JP | 63-024422 | A | 2/1988 |
| JP | 03-022141 | A | 1/1991 |

OTHER PUBLICATIONS

"Weak symbol", From Wikipedia, the free encyclopedia, Retrieved on Oct. 18, 2011, 2 pages. Retrieved from: http://en.wikipedia.orglw/index.php?title=Weak_symbol&oldid=34.
European Search Report received for European Patent Application No. 11250455.0, mailed on Nov. 7, 2011, 3 pages.
Office Action Received for European Patent Application No. 11250455.0, mailed on Jan. 17, 2012, 3 pages.
Office Action Received for Korean Patent Application No. 2011-0034452 mailed on Oct. 5, 2012, 2 pages.
Chinese Office Action Received for the Patent application No. 201110126383.3 mailed on Sep. 28, 2012. 10 Pages of Office including 1 page of Search Report 4 pages of English translation.
Office Action received for Japanese Patent Application No. 2011-088417, mailed on Feb. 5, 2013, 6 pages of Office Action including 3 pages of English Translation.
Levine, John R., "Linkers & Loaders", Sep. 25, 2001, 299 pages.

* cited by examiner

*Primary Examiner* — Li B Zhen
*Assistant Examiner* — V Miller
(74) *Attorney, Agent, or Firm* — Garrett IP, LLC (57) ABSTRACT

Methods and systems to compile a code module to permit a caller routine to pass a parameter to a callee routine of a separately compiled code module, and to permit a callee routine to receive a parameter from a caller routine of the separately compiled code module, through multiple interfaces. Interfaces may include an interface by convention and an alternate interface. A caller routine may be configured to pass a parameter through an alternate interface and call to an alternate entry point of a callee routine. An associated stub routine may be configured to pass the parameter through an interface by convention and to call to a conventional entry point of the callee routine. If the callee routine includes a corresponding alternate entry point, the caller routine may be linked to the alternate entry point. Otherwise, the callee routine may be linked to the callee routine through the stub routine.

17 Claims, 9 Drawing Sheets

METHODS AND SYSTEMS TO IMPLEMENT NON-ABI CONFORMING FEATURES ACROSS UNSEEN INTERFACES

BACKGROUND

In a computer program, a caller routine of a first compilation module may pass a set of one or more parameters to a callee routine of separately compiled second compilation module through an interface, and the compilation modules may be subsequently linked to execute within a computer system.

The interface may correspond to an accepted convention or standard, such as an application binary interface (ABI). An ABI may describe a low-level interface between computer programs, and may address calling convention details such as data type, size, and alignment, to control passing and returning of function arguments or parameters. Under Windows IA-32 and Linux calling conventions, for example, function parameters are passed on a call stack.

Low level software writers or compilers may construct an interface that does not follow convention, or modify an existing interface such that the interface no longer follows convention. In a 32 bit Windows or Linux environment, for example, an interface may be modified to pass a parameter through a register to avoid memory load/stores associated with a call stack.

Conventionally, an interface may be constructed or modified contrary to convention when a modifier (programmer or compiler) has access to the callee and all callers of the callee. Where not all of the callers are available, the interface of available callers may be modified provided that the callee is configured to accommodate both the modified interface and an interface by convention, which may be used by other callers. In other words, the callee routine and at least one of the caller routines are modified.

BRIEF DESCRIPTION OF THE DRAWINGS/FIGURES

In the drawings, the leftmost digit(s) of a reference number identifies the drawing in which the reference number first appears.

DETAILED DESCRIPTION

Disclosed herein are methods and systems to configure a caller routine with multiple interfaces to pass a parameter set to a separately compiled callee routine, and to link the compiled caller routine and the compiled callee routine through one or more of the multiple interfaces based upon a configuration of the callee routine. The multiple interfaces may include an interface by convention and an alternate interface. Also disclosed herein are methods and systems to configure a callee routine with multiple entry points to receive a parameter set from another compilation module through one of multiple corresponding interfaces.

Figure 1:
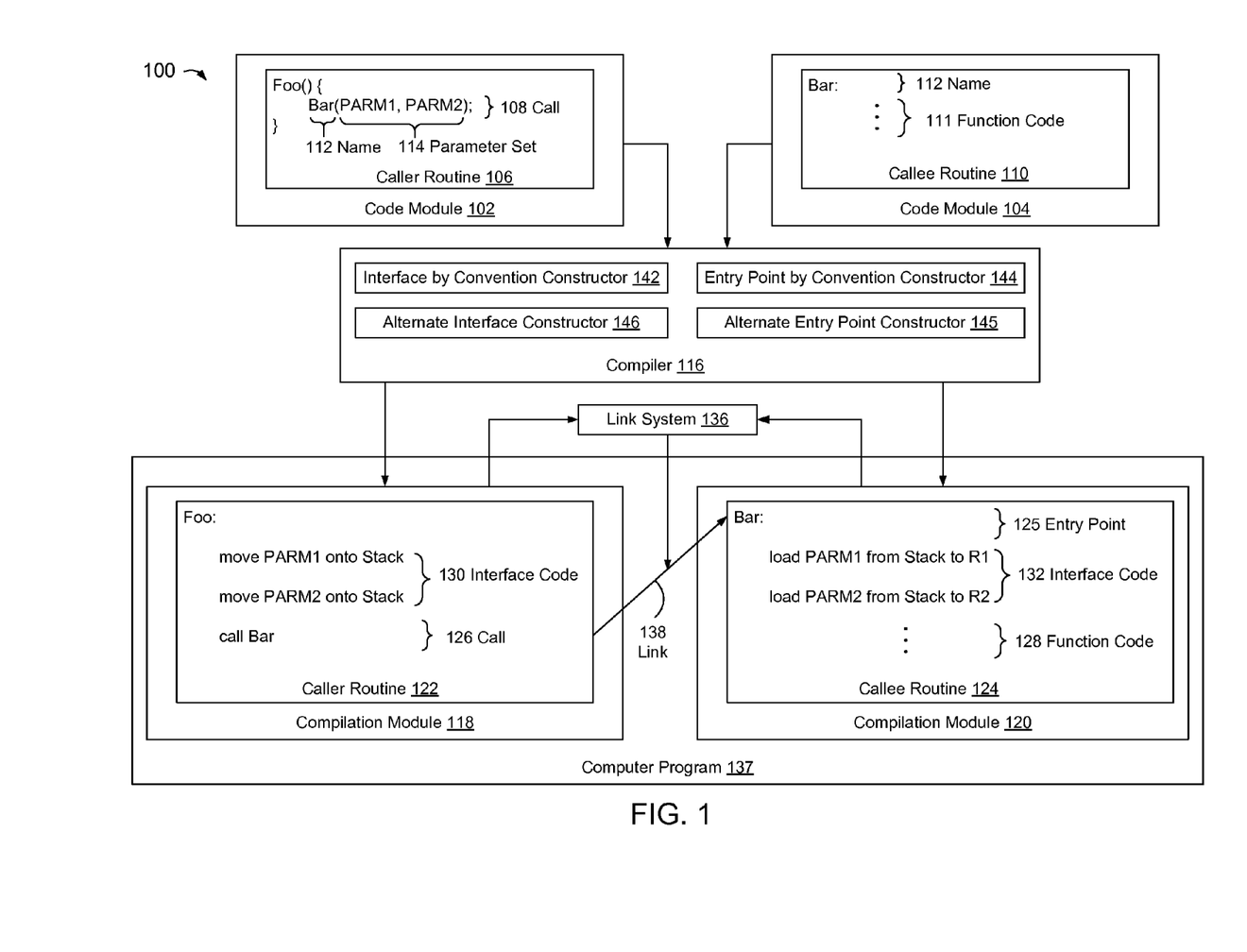
FIG. 1 is a graphic depiction of a computing environment, including first and second code modules and corresponding first and second compilation modules.

FIG. 1 is a graphic depiction of a computing environment 100, including first and second code modules 102 and 104, respectively. Code modules 102 and 104 may include source level code and/or intermediate level code.

Code module 102 includes a caller routine 106 having a call 108 to a callee routine 110 of code module 104.

Call 108 may include a name 112 and an indication or identification of a set of one or more parameters 114 (e.g., PARM1 and PARM2), to be passed to callee routine 110 during run-time.

Callee routine 110 may include function code 111 to perform one or more functions with respect to the parameter set.

Environment 100 may include a compiler 116 to compile code modules 102 and 104 to corresponding first and second compilation modules 118 and 120. Alternatively, one of code modules 102 and 104 may be compiled by another compiler. Compilation modules 118 and 120 may include machine-readable code.

Compilation module 118 includes a caller routine 122 corresponding to caller routine 106. Caller routine 122 includes a call 126, corresponding to call 108 of caller routine 106.

Compilation module 120 includes a callee routine 124 having an entry point 125 identified with name 112, corresponding to callee routine 110. Callee routine 124 further includes function code 128 corresponding to function code 111.

When code modules 102 and 104 are compiled separately from one another, caller routine 122 and callee routine 124 may be configured to pass parameter set 114 in accordance with a convention and/or a standard, which may include, without limitation, passing parameters on a call stack.

In the example of FIG. 1, caller routine 122 includes interface code 130 to pass parameter set 114 through a call stack, and callee routine 124 includes interface code 132 to receive parameter set 114 through the call stack upon entry at entry point 125. The call stack, and any formatting requirements, may be referred to as an interface.

Compiler 116 may include an interface by convention constructor 142 to construct interface code 130 in accordance with a convention, and an entry point by convention constructor 144 to construct entry point 125 and corresponding interface code 132 in accordance with convention.

Alternatively, where compilation module 118 or compilation module 120 is generated by another compiler, the corresponding interface code may be generated by the other compiler.

Environment 100 may include a link system 136 to link compilation modules 118 and 120, to permit a computer system to execute compilation modules 118 and 120 as an integrated computer program 137. FIG. 1 includes a link 138 from call 126 to entry point 125 of callee routine 124.

In some situations, it may be desirable to pass a parameter through an alternate interface, which may not conform to convention. For example, in FIG. 1, interface code 132 of callee routine 124 is configured to load parameter set 114 from the call stack to registers R1 and R2, respectively. Function code 128 may be configured to access the parameters in registers R1 and R2. In such a situation, it may be desirable to configure caller routine 122 and callee routine 124 to pass parameter set 114 through registers R1 and R2.

Compiler 116 may include an alternate entry point constructor 145 to construct an alternate entry point within a callee routine, such as described below with respect to FIG. 3.

Compiler 116 may further include an alternate interface constructor 146 to construct an alternate interface and a corresponding alternate call to an alternate entry point within a callee routine, such as described below with respect to FIG. 2.

Compiler 116 may be configured to construct an interface by convention and an alternate interface with respect to a caller routine, which may permit the caller routine to call to a suitably modified callee routine or an unmodified callee routine.

Similarly, compiler 116 may be configured to construct an entry point by convention, a corresponding interface by convention, and an alternate entry point, with respect to a callee routine, which may permit callee routine to be called by a suitably modified caller routine and an unmodified caller routine.

Figure 8:
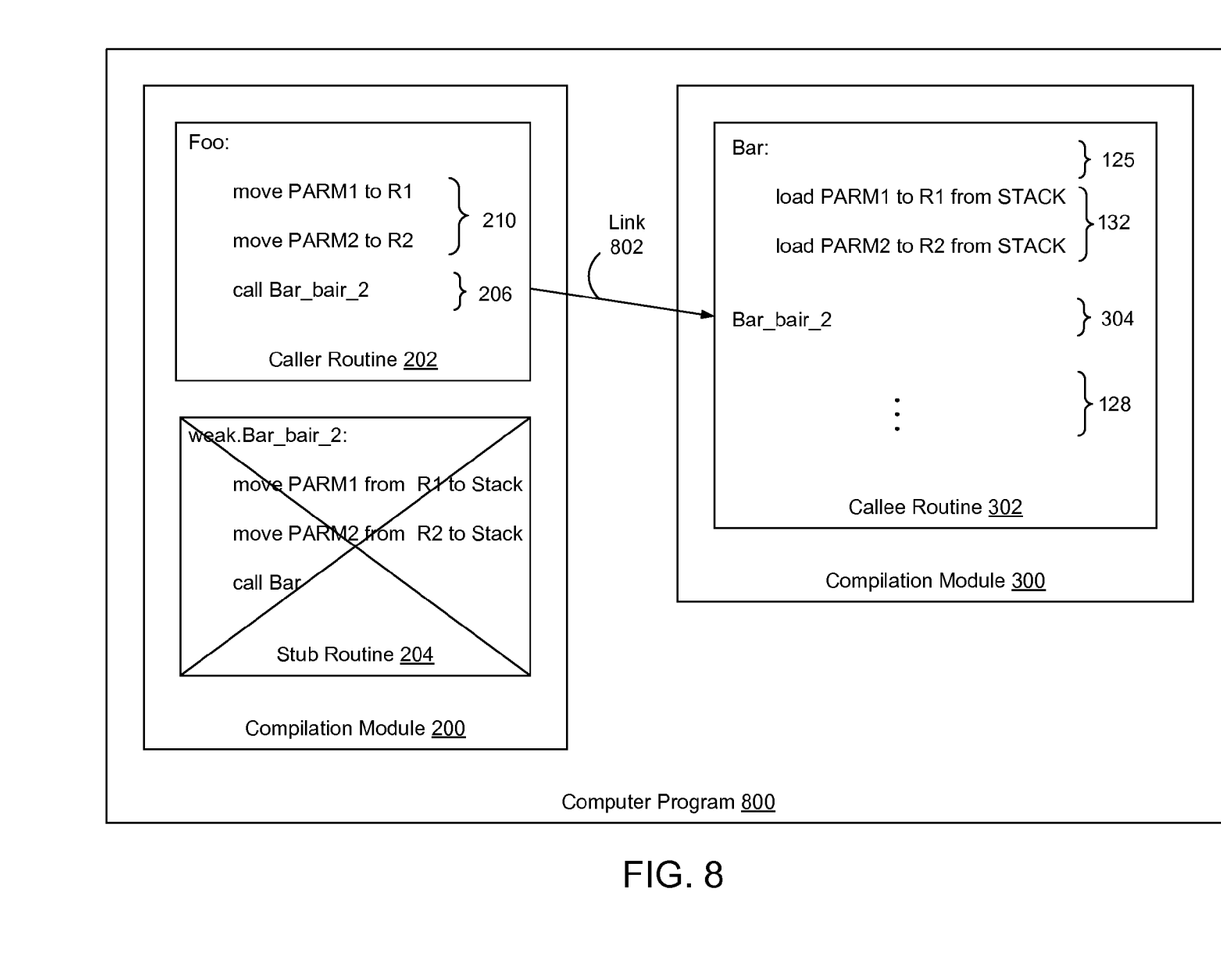
FIG. 8 is a graphic depiction of a computer program, including the compilation modules of FIGS. 2 and 3, wherein a call of a caller routine is linked to an alternate entry point of a callee routine.
Figure 9:
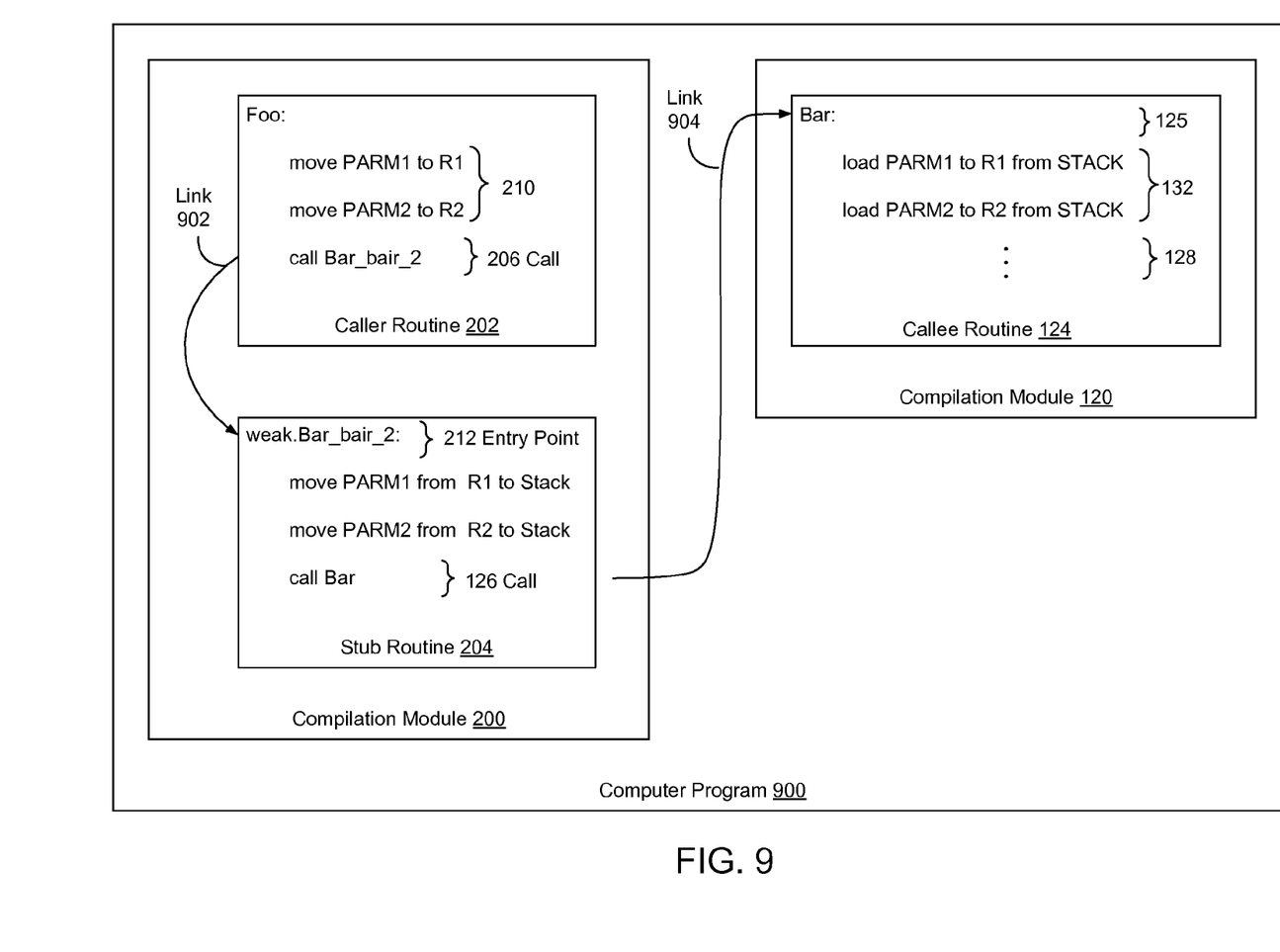
FIG. 9 is a graphic depiction of another computer program, including the compilation module of FIG. 2 and a compilation module of FIG. 1, wherein a call of a caller routine is linked to stub routine, and a call of the stub routine is linked to entry point of a callee routine.

Link system 136 may be configured to selectively link a caller routine to a callee routine through an alternate interface when both the caller routine and the callee routine are appropriately configured, such as described below with respect to FIG. 8, and through an interface by convention otherwise, such as described below with respect to FIG. 9.

In examples above, an alternate interface, an alternate call, and an alternate entry point are described as constructed by compiler 116. Alternatively, an alternate interface and a corresponding alternate call, or an alternate entry point may be constructed subsequent to compilation, such as with a machine code editor in response to user input.

Figure 2:
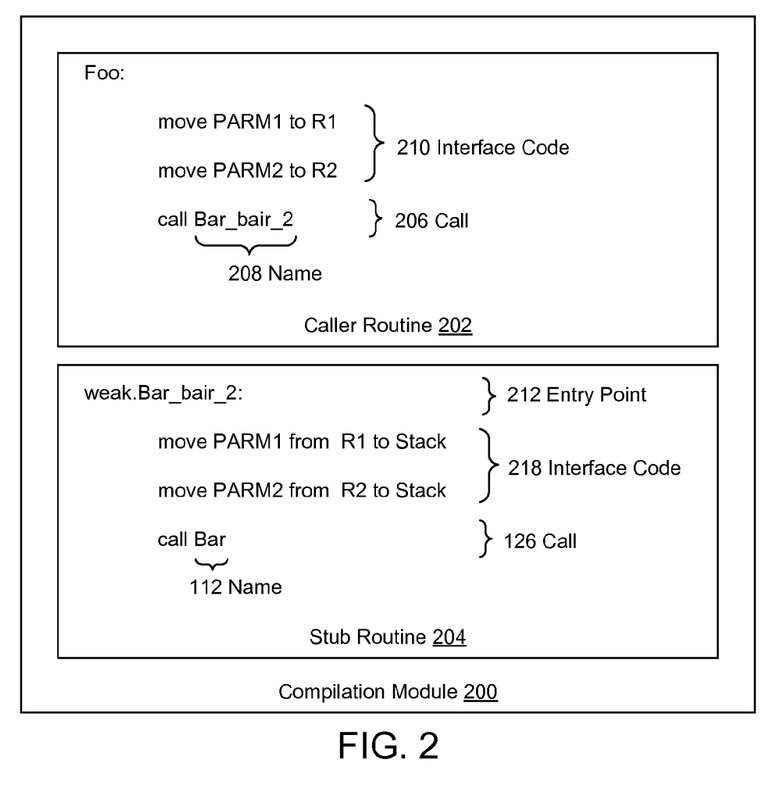
FIG. 2 is a graphic depiction of a compilation module, including a caller routine and a stub routine.

FIG. 2 is a graphic depiction of a compilation module 200, including a caller routine 202 and a stub routine 204.

Compilation module 200 may be generated by compiler 116 from code module 102 in FIG. 1. Alternatively, where compilation module 118 in FIG. 1 is generated by another compiler, compilation module 200 in FIG. 2 may be constructed or modified from compilation module 118, such as by a machine code editor in response to user input.

Caller routine 202 includes a call 206 to a name 208, illustrated here as Bar_bair_2. Caller routine 202 further includes corresponding interface code 210 to pass parameter set 114 (e.g., PARM1 and PARM2) through a first interface, illustrated here as registers R1 and R2. The first interface may correspond to an alternate interface and call 206 may be referred to as an alternate call.

Name 208 may be generated as a function of call name 112 of caller routine 106 in FIG. 1. Name 208 may be generated further as a function of a name of the first interface and a number of parameters within parameter set 114. For example, "bair" may represent "blind arguments in registers," and "2" may represent the number of parameters within parameter set 114. Name 208 may be referred to as an alternate name.

Stub routine 204 includes call 126 to name 112, and corresponding interface code 218 to pass parameter set 114 from the first interface (e.g., R1 and R2), through a second interface (e.g., call stack). Interface code 218 may correspond to an interface by convention.

Stub routine 204 may be associated with caller routine 202 to permit link system 136 to link caller routine 202 to stub routine 204. For example, an entry point 212 of stub routine 204 may be named as a "weak" version of alternate name 208, illustrated here as weak.Bar_bair_2.

Figure 3:
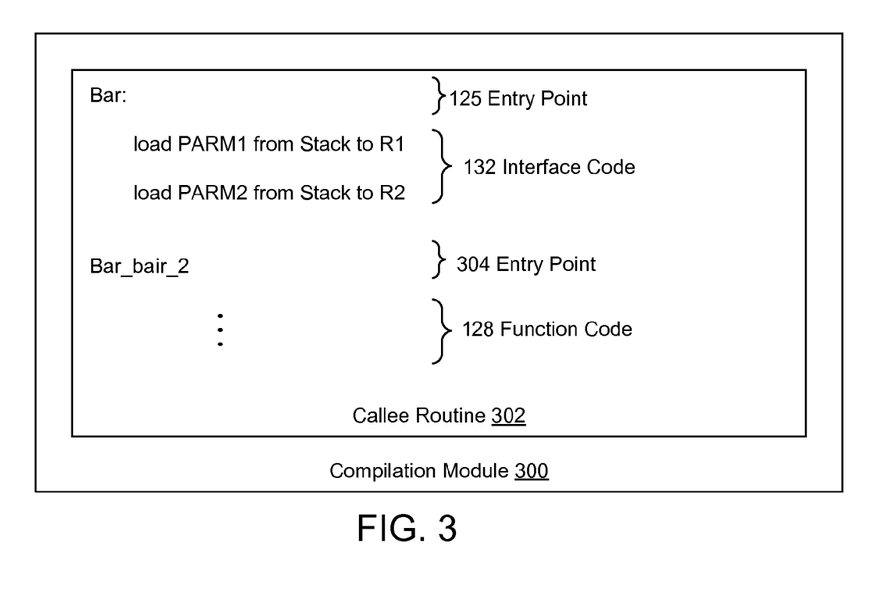
FIG. 3 is graphic depiction of a compilation module including a callee routine.

FIG. 3 is graphic depiction of a compilation module 300 including a callee routine 302.

Compilation module 300 may be generated by compiler 116 from code module 104 in FIG. 1. Alternatively, where compilation module 120 in FIG. 1 is generated by another compiler, compilation module 300 may be constructed or modified from compilation module 120, such as by a machine code editor in response to user input.

Callee routine 302 includes entry point 125, and corresponding interface code 132 receive parameter set 114 through the call stack, such as described above with respect to callee routine 124 in FIG. 1. Entry point 125 may correspond to an entry point by convention, and interface code 132 may correspond to an interface by convention.

Callee routine 302 may include an alternate entry point 304, illustrated here between interface code 132 and function code 128.

Interface code 132 may be configured to move parameter set 114 from the call stack to as registers R1 and R2, and function code 126 may be configured to access parameter set 114 at registers R1 and R2, such as described above with respect to callee routine 124 in FIG. 1.

In such a situation, alternate entry point 304 does not need corresponding interface code. In other situations, entry point 304 may include interface code to relocate and/or format parameter set 114.

Example methods are disclosed below with respect to FIGS. 4-7, and with respect to one or more of other examples herein. The examples of FIGS. 4-7 are not, however, limited to such other examples.

Figure 4:
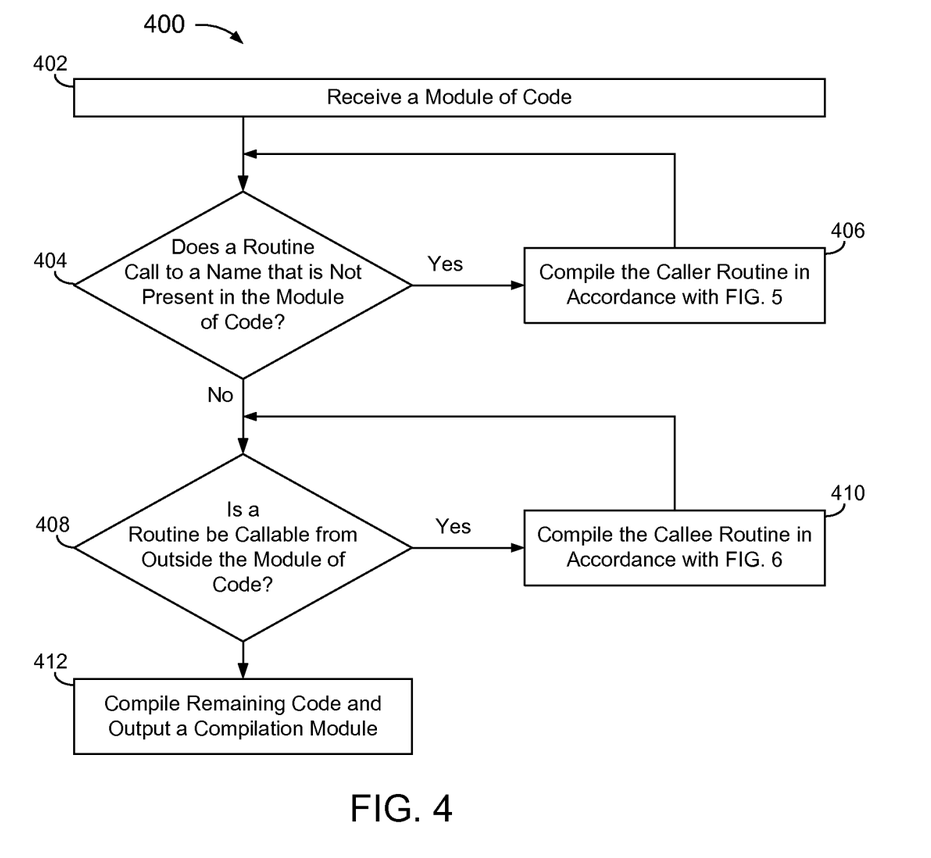
FIG. 4 is a flowchart of a method of compiling a module of code, which may include a caller routine and/or a callee routine.

FIG. 4 is a flowchart of a method 400 of compiling a module of code, which may include a caller routine and/or a callee routine.

At 402, a module of code is received. In FIG. 1, compiler 116 may receive code module 102 and/or code module 104.

At 404, a caller routine within the module of code is evaluated, such as caller routine 106 in FIG. 1. Where the caller routine calls to a name that is not present in the module of code, processing proceeds to 406, where the caller routine is compiled in accordance with FIG. 5, described below. The evaluating at 404 and the compiling at 406 may be repeated for one or more additional caller routines.

At 408, a callee routine within the module of code is evaluated. Where the callee routine is callable from outside of the module of code, processing proceeds to 410, where the callee routine is compiled in accordance with FIG. 6, described below. The evaluating at 408 and the compiling at 410 may be repeated for one or more additional callee routines.

At 412, other code of the module of code may be compiled, such as accordance with a conventional compiling technique.

Features disclosed above with respect to FIG. 4, and/or portions thereof, may be performed in one or more of a variety of sequences relative to one another, in parallel with one another, and/or in an integrated fashion.

Figure 5:
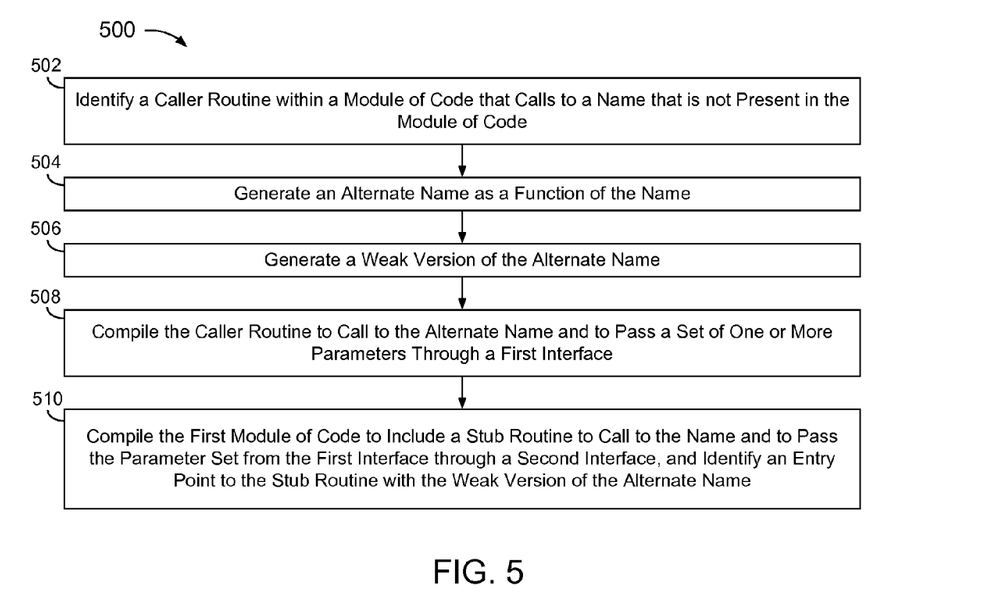
FIG. 5 is a flowchart of a method of compiling a module of code to pass a parameter set from a caller routine to a callee routine of another compilation module through one of a plurality of interfaces.

FIG. 5 is a flowchart of a method 500 of compiling a module of code to pass a parameter set from a caller routine to a callee routine of another compilation module through one of a plurality of interfaces.

At 502, a caller routine is identified within a module of code as having a call to a name that is not present in the module of code.

At 504, an alternate point name is generated. The alternate point name may be generated as a function of the call name, an indication of the first interface, and a number of parameters to be passed through the first interface.

At 506, a weak version of the alternate name is generated, such as described above with respect to entry point 212 in FIG. 2.

At 508, the caller routine is compiled to call to the alternate name and to pass parameter set through a first interface, such as described above with respect to caller routine 202 in FIG. 2.

At 510, the first module of code is compiled to include a stub routine to call to the name and to pass the parameter set from the first interface through a second interface. The stub routine, or an entry point to the stub routine, is identified with the weak version of the alternate name, such as described above with respect to stub routine 204 in FIG. 2.

Figure 6:
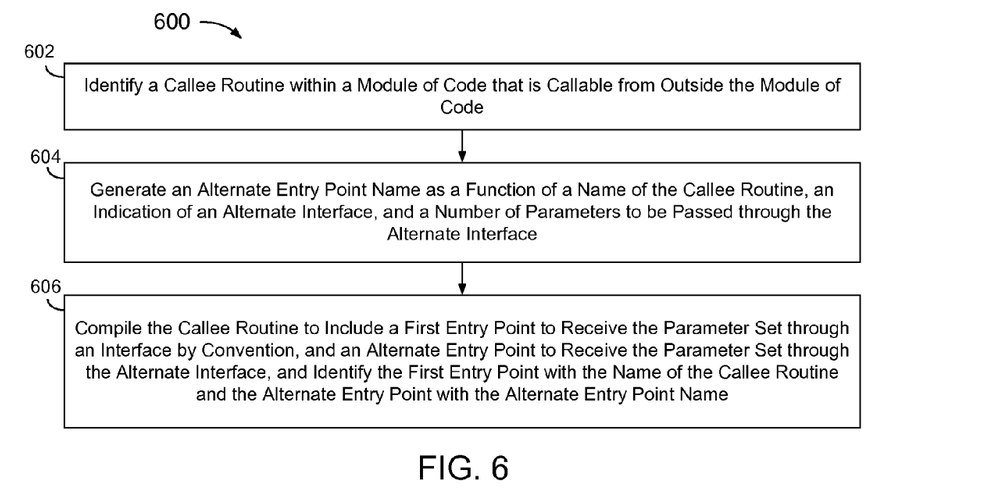
FIG. 6 is a flowchart of a method of compiling a module of code to provide a plurality of entry points to a callee routine to receive a parameter set through one of a plurality of corresponding interfaces.

FIG. 6 is a flowchart of a method 600 of compiling a module of code to provide a plurality of entry points to a callee routine to receive a parameter set through one of a plurality of corresponding interfaces.

At 602, a callee routine is identified within a module of code, as being callable from outside of the module of code.

At 604, an alternate entry point name is generated. The alternate entry point name may be generated as a function of a name of the callee routine, an indication of an alternate interface, and a number of parameters to be passed through the alternate interface.

At 606, the callee routine is compiled to include a first entry point to receive the parameter set through an interface by convention, and the alternate entry point to receive the parameter set through the alternate interface. The first entry point may be identified with the name of the callee routine, and the alternate entry point may be identified with the alternate entry point name, such as described above with respect to callee routine 302 in FIG. 3.

Figure 7:
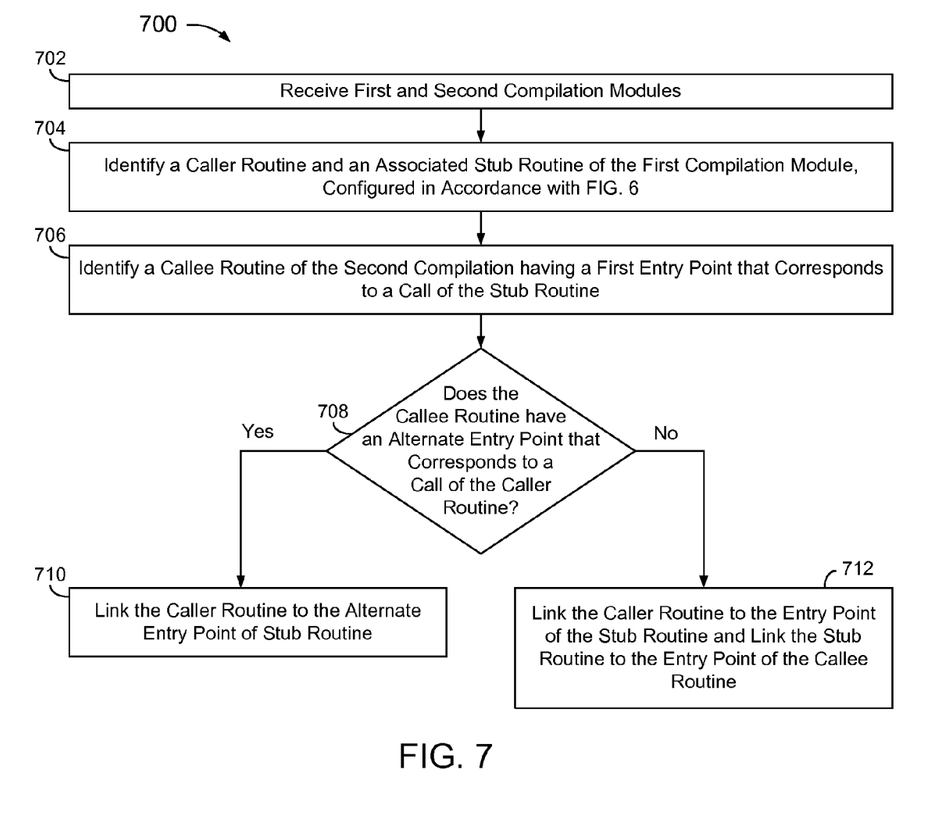
FIG. 7 is a flowchart of a method of linking a caller routine of a first compilation module to a callee routine of a second compilation module.

FIG. 7 is a flowchart of a method 700 of linking a caller routine of a first compilation module to a callee routine of a second compilation module.

At 702, first and second compilation modules are received, such as at link system 136 in FIG. 1. The first compilation module may correspond to compilation module 200 in FIG. 2. The second compilation module may correspond to compilation module 120 in FIG. 1 or compilation module 300 in FIG. 3.

At 704, a caller routine and an associated stub routine of the first compilation module, configured in accordance with method 600, are identified. The caller routine and associated stub routine may correspond to caller routine 202 and stub routine 200 in FIG. 2.

At 706, a callee routine of the second compilation module, having a first entry point that corresponds to a call of the stub routine, is identified. The callee routine may correspond to callee routine 124 in FIG. 1 or callee routine 302 in FIG. 3.

At 708, the callee routine is evaluated. Where the callee routine includes an alternate entry point as described above with respect to 606 in FIG. 6, processing proceeds to 710. Where the callee routine includes does not include such an alternate entry point, processing proceeds to 712.

At 710, the caller routine is linked to the alternate entry point of the callee routine. FIG. 8 is a graphic depiction of a computer program 800, including compilation module 200 of FIG. 2 and compilation module 300 of FIG. 3, wherein call 206 is linked to alternate entry point 304 of callee routine 302 with a link 802.

At 712, the caller routine is linked to the stub routine and the stub routine is linked to the first entry point of the callee routine. FIG. 9 is a graphic depiction of a computer program 900, including compilation module 200 of FIG. 2 and compilation module 120 of FIG. 1, wherein call 206 is linked to stub routine 204 with a link 902, and call 126 of stub routine 204 is linked to entry point 125 of callee routine 124 with a link 904.

In examples above, two parameters (PARM1 and PARM2) are passed through registers R1 and R2 or through a call stack. Methods and systems disclosed herein are not, however, limited to registers or call stacks.

An alternate interface may be configured to perform tasks and/or logic operations. Example tasks and logic operations are disclosed below. Alternate interfaces are not, however, limited to the examples below.

An alternate interface may be constructed to combine a plurality of parameters from multiple locations, and to pass the combined parameters through a single location, such as described below with respect to FIG. 10.

An alternate interface may be constructed to pass a parameter set through one of a plurality of selectable interfaces, such as described below with respect to FIG. 11.

An alternate interface may be constructed to pass a first parameter set through a first interface and a second parameter set through second interface.

Figure 10:
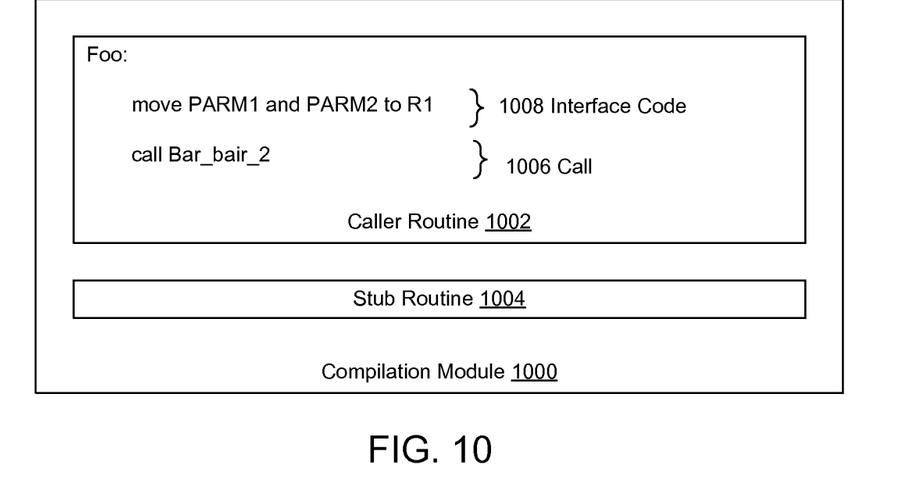
FIG. 10 is a graphic depiction of a compilation module, including a caller routine to pass a plurality of parameters from a plurality of corresponding locations through a single interface.

FIG. 10 is a graphic depiction of a compilation module 1000, including a caller routine 1002 and a stub routine 1004. Caller routine 1002 may include an alternate call 1006 and corresponding alternate interface code 1006 to pass a plurality of parameters from multiple locations through a single alternate interface, illustrated here as a register R1. Alternate interface code 1006 may be configured to combine or manipulate the parameters prior to loading to the register. Stub routine 1004 may be configured to pass the plurality of parameters by convention, such as described in one or more examples above.

Figure 11:
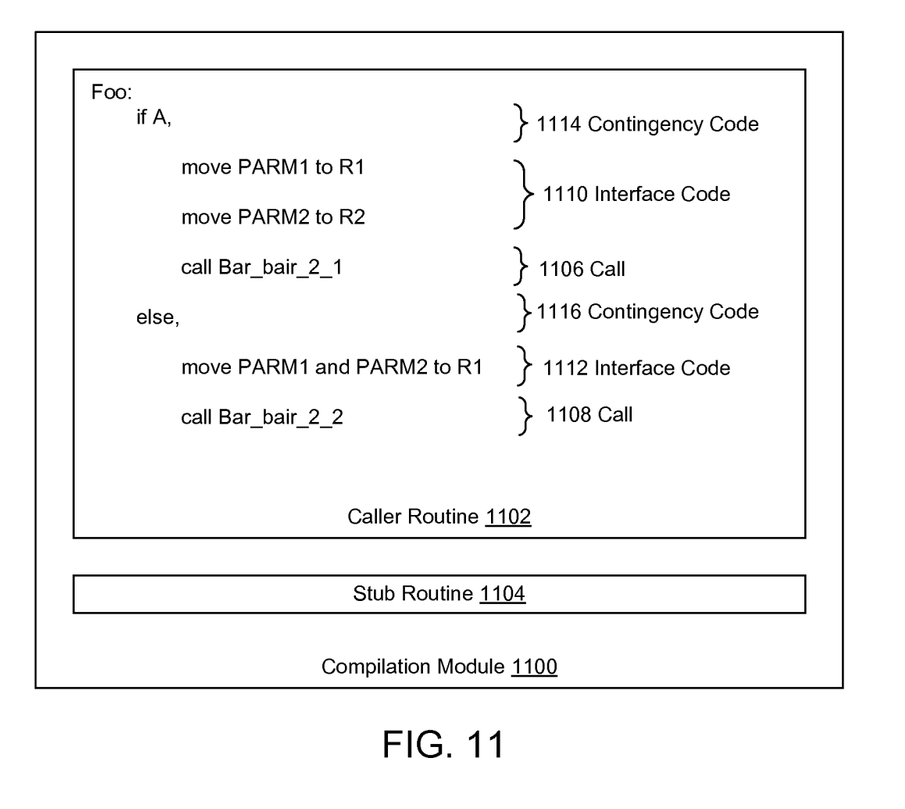
FIG. 11 is a graphic depiction of another compilation module, including a caller routine to selectively pass a parameter set through one of a plurality of interfaces.

FIG. 11 is a graphic depiction of a compilation module 1100, including a caller routine 1102 and a stub routine 1104. Caller routine 1102 includes a plurality of alternate calls 1106 and 1108, directed to a corresponding plurality of alternate entry points of a callee routine. Alternate call 1106 includes alternate interface code 1110 to pass a parameter set through a first alternate interface, illustrated here as registers R1 and R2. Alternate call 1108 includes alternate interface code 1112 to combine the parameter set and to pass the combined parameter set through a second alternate interface, illustrated here as register R1.

Caller routine 1102 further includes contingency logic 1114 and 1116 to selectively invoke alternate call 1106 or alternate call 1108 based on a contingency "A." The contingency may relate to a value of one or more parameters and/or one or more conditions.

Stub routine 1104 may be configured to pass the parameter set in accordance with a convention when a callee routine does not include the alternate entry points.

One or more features disclosed herein may be implemented in hardware, software, firmware, and combinations thereof, including discrete and integrated circuit logic, application specific integrated circuit (ASIC) logic, and microcontrollers, and may be implemented as part of a domain-specific integrated circuit package, or a combination of integrated circuit packages. The terms software, code, and instructions, as used herein, refer to a computer program product including a computer readable medium having computer program logic stored therein to cause a computer system to perform one or more features and/or combinations of features disclosed herein.

Figure 12:
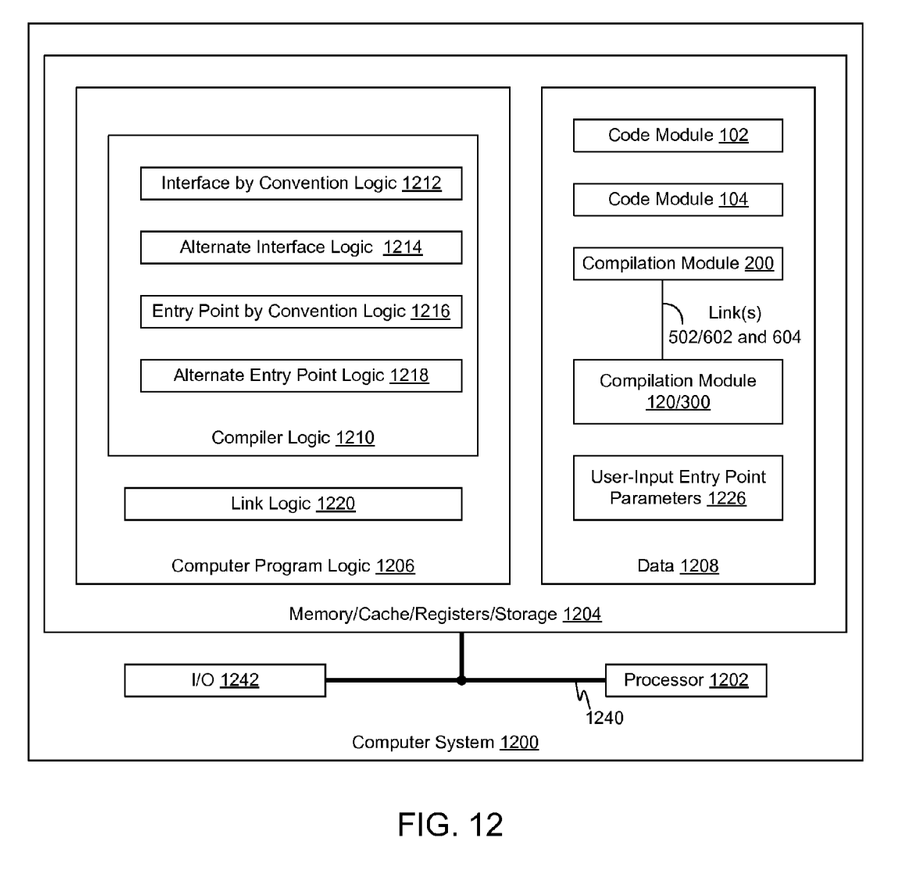
FIG. 12 is a block diagram of a computer system configured to compile modules of code and to link compilation modules.

FIG. 12 is a block diagram of an exemplary computer system 1200, including one or more computer instruction processing units, illustrated here as a processor 1202, to execute computer program product logic.

Computer system 1200 includes one or more of memory, cache, registers, and storage (hereinafter, "memory") 1204.

Memory 1204 includes a computer readable medium having computer program product logic 1206 stored thereon to cause processor 1202 to perform one or more functions in response thereto.

Memory 1204 further includes data 1208 to be used by processor 1202 in executing logic 1206, and/or generated by processor 1202 in response to execution of logic 1206.

Data 1208 may include code module 102 and/or code module 104 of FIG. 1.

Logic 1206 includes compiler logic 1210 to cause processor 1202 to compile code module 102 and/or code module 104 to generate corresponding compilation modules 200 and 300, such as described in one or more examples above. Alternatively, code module 102 or code module 104 may be compiled by another compiler to generate compilation module 118 or compilation module 120, respectively.

Compiler logic 1210 may include interface by convention logic 1212 to cause processor 1202 to generate interface code to permit a caller routine to pass a parameter set according to convention, such as described in one or more examples above.

Compiler logic 1210 may include alternate interface logic 1214 to cause processor 1202 to generate alternate interface code to permit the caller routine to pass the parameter set through an alternate interface, such as described in one or more examples above.

Compiler logic 1210 may include entry point by convention logic 1216 to cause processor 1202 to construct an entry point and corresponding interface code to permit a callee routine to receive a parameter set by convention, such as described in one or more examples above.

Compiler logic 1210 may include alternate entry point logic 1218 to cause processor 1202 to construct an alternate entry to permit the callee routine to receive the parameter set through an alternate interface, such as described in one or more examples above.

Logic 1206 may include link logic 1220 to cause processor 1202 to link multiple compilation modules, including to selectively link a caller routine to an alternate entry point of a callee routines, or to link the caller routine to the callee through a stub routine, such as described in one or more examples above.

Computer system 1200 may include a communications infrastructure 1240 to communicate within computer system 1200, and an input/output controller 1242 to interface with one or more other computer systems over a network communication system, such as the Internet.

Methods and systems are disclosed herein with the aid of functional building blocks to illustrate functions, features, and relationships thereof. One or more such boundaries may be arbitrarily defined herein for the convenience of description. Alternate boundaries may be defined.

While various embodiments are disclosed herein, it should be understood that they have been presented by way of example, not limitation. It will be apparent to persons skilled in the relevant art that various changes in form and detail may be made therein without departing from the spirit and scope of the methods and systems disclosed herein. Thus, the breadth and scope of the claims should not be limited by any of examples disclosed herein.

What is claimed is:

1. A system, comprising:
a processor; and
a memory to store a computer program including instructions to cause the processor to:
generate a first compilation module from a module of code, including to,
identify a caller routine that calls to a name that is not present in the first module of code,
generate an alternate name as a function of the name, and generate a weak version of the alternate name,
compile the caller routine to pass a set of one or more parameters through a first interface corresponding to a register and to call to the alternate name, and
compile the first module of code to include a stub routine having an entry point identified with the weak version of the alternate name, and configured to pass the parameter set from the first interface through a second interface, corresponding to a call stack, and to call to the name; and
link the first compilation module with a second compilation module that includes a callee routine having a first entry point identified with the name, wherein the link system is configured to,
link the caller routine to an alternate entry point of the callee routine having the alternate name when the callee routine includes the alternate entry point, and
link the caller routine to the entry point of the stub routine and link the stub routine to the first entry point of the callee routine when the callee routine does not include the alternate entry point.

2. The system of claim 1, wherein the instructions to cause the processor to generate a first compilation module further includes instructions to cause the processor to:
identify a callee routine within the first module of code,
generate an alternate entry point name as a function of a name of the identified callee routine, and
compile the identified callee routine to include a first entry point having the name of the callee routine and configured to receive the parameter set through the second interface, and to include an alternate entry point having the alternate entry point name and configured to receive the parameter set through the first interface.

3. The system of claim 1, wherein the second interface corresponds to a convention and the first interface does not correspond to the convention.

4. The system of claim 1, wherein the instructions to cause the processor to generate further include instructions to cause the processor to generate the alternate name as a function of the name, an indication of the first interface, and a number of parameters in the parameter set.

5. A method, comprising:
compiling a module of code to generate a first compilation module, including,
identifying a caller routine that calls to a name that is not present in the first module of code,
generating an alternate name as a function of the name,
generating a weak version of the alternate name,
compiling the caller routine to pass a set of one or more parameters through a first interface corresponding to a register and to call to the alternate name, and
compiling the first module of code to include a stub routine having an entry point identified with the weak version of the alternate name, and configured to pass the parameter set from the first interface through a second interface, corresponding to a call stack, and to call to the name; and
linking the first compilation module with a second compilation module that includes a callee routine having a first entry point identified with the name, including,
linking the caller routine to an alternate entry point of the callee routine having the alternate name when the callee routine includes the alternate entry point, and
linking the caller routine to the entry point of the stub routine and linking the stub routine to the first entry point of the callee routine when the callee routine does not include the alternate entry point,
wherein the compiling and linking is performed in a suitably programmed computer system.

6. The method of claim 5, wherein the compiling further includes:
identifying a callee routine within the first module of code;
generating an alternate entry point name as a function of a name of the identified callee routine; and
compiling the identified callee routine to include a first entry point having the name of the callee routine and configured to receive the parameter set through the second interface, and to include an alternate entry point having the alternate entry point name and configured to receive the parameter set through the first interface.

7. The method of claim 5, wherein the compiling further includes compiling the caller routine to pass the parameter set through a selected one of a plurality of interfaces.

8. The method of claim 7, wherein the compiling further includes compiling the caller routine to pass the parameter set through a selected one of the plurality of interfaces based on a value of a parameter of the parameter set.

9. The method of claim 5, wherein the compiling further includes compiling the caller routine to combine a plurality of parameters from a multiple locations and to pass the plurality of parameters through the first interface.

10. A non-transitory computer program product including a non-transitory computer readable medium having computer program logic recorded thereon, the computer program logic comprising:
compiler logic to cause a computer system to compile a module of code to generate a first compilation module, wherein the compiler logic includes,
logic to cause the computer system to identify a caller routine that calls to a name that is not present in the first module of code,
logic to cause the computer system to generate an alternate name as a function of the name, and to generate a weak version of the alternate name,
logic to cause the computer system to compile the caller routine to pass a set of one or more parameters through a first interface corresponding to a register and to call to the alternate name, and
logic to cause the computer system to compile the first module of code to include a stub routine having an entry point identified with the weak version of the alternate name, and configured to pass the parameter set from the first interface through a second interface, corresponding to a call stack, and to call to the name; and
link logic to cause the computer system to link the first compilation module with a second compilation module that includes a callee routine having an entry point identified with the name, wherein the link logic includes logic to cause the processor system to,
link the caller routine to an alternate entry point of the callee routine having the alternate name when the callee routine includes the alternate entry point, and
link the caller routine to the entry point of the stub routine and link the stub routine to the first entry point of the callee routine when the callee routine does not include the alternate entry point.

11. The non-transitory computer program product of claim 10, wherein the compiler logic further includes:
logic to cause the computer system to identify a callee routine within the first module of code;
logic to cause the computer system to generate an alternate entry point name as a function of a name of the identified callee routine; and
logic to cause the computer system to compile the identified callee routine to include a first entry point having the name of the callee routine and configured to receive the parameter set through the second interface, and to include an alternate entry point having the alternate entry point name and configured to receive the parameter set through the first interface.

12. The non-transitory computer program product of claim 10, wherein the compiler logic further includes logic to cause the computer system to generate the alternate name as a function of the name, an indication of the first interface, and a number of parameters in the parameter set.

13. The non-transitory computer program product of claim 10, wherein the compiler logic further includes logic to cause the computer system to compile the caller routine to pass the parameter set through a selected one of a plurality of interfaces.

14. The non-transitory computer program product of claim 13, wherein the compiler logic further includes logic to cause the computer system to compile the caller routine to pass the parameter set through a selected one of a plurality of interfaces based on a value of a parameter of the parameter set.

15. The non-transitory computer program product of claim 10, wherein the compiler logic further includes logic to cause the computer system to compile the caller routine to combine a plurality of parameters from multiple locations and to pass the plurality of parameters through the first interface.

16. The method of claim 5, wherein the generating the alternate name includes generating the alternate name as a function of the name, an indication of the first interface, and a number of parameters in the parameter set.

17. The non-transitory computer program product of claim 10, wherein the logic to cause the processor to generate an alternate name further includes logic to cause the processor to generate the alternate name as a function of the name, an indication of the first interface, and a number of parameters in the parameter set.

* * * * *